United States Patent
Ziche

(10) Patent No.: US 8,357,755 B2
(45) Date of Patent: Jan. 22, 2013

(54) CROSS-LINKABLE ORGANOSILICON-BASED COMPOSITIONS

(75) Inventor: Wolfgang Ziche, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/384,322

(22) PCT Filed: Jul. 7, 2010

(86) PCT No.: PCT/EP2010/059687
§ 371 (c)(1),
(2), (4) Date: Jan. 16, 2012

(87) PCT Pub. No.: WO2011/006808
PCT Pub. Date: Jan. 20, 2011

(65) Prior Publication Data
US 2012/0123048 A1 May 17, 2012

(30) Foreign Application Priority Data
Jul. 17, 2009 (DE) .................. 10 2009 027 817

(51) Int. Cl.
*C08L 83/04* (2006.01)

(52) U.S. Cl. ........ 525/103; 525/102; 525/105; 525/106; 525/100

(58) Field of Classification Search .................. 525/100, 525/102, 103, 105, 106
See application file for complete search history.

(56) References Cited

U.S. PATENT DOCUMENTS

| | | | |
|---|---|---|---|
| 5,401,787 A * | 3/1995 | Tonyali ........................ | 524/101 |
| 6,395,858 B1 | 5/2002 | Mack et al. | |
| 6,576,733 B1 | 6/2003 | Fujita et al. | |
| 2004/0181025 A1* | 9/2004 | Schindler et al. .............. | 528/38 |
| 2008/0125539 A1 | 5/2008 | Mack | |
| 2009/0131591 A1 | 5/2009 | Schindler et al. | |

FOREIGN PATENT DOCUMENTS

| | | |
|---|---|---|
| DE | 102004055450 A1 | 5/2006 |
| DE | 102006022834 A1 | 11/2007 |
| EP | 0997469 A2 | 5/2000 |
| EP | 1179571 A1 | 2/2002 |
| EP | 1216263 B1 | 10/2003 |
| WO | 03014226 A1 | 2/2003 |

\* cited by examiner

*Primary Examiner* — Margaret Moore
(74) *Attorney, Agent, or Firm* — Brooks Kushman P.C.

(57) ABSTRACT

Moisture curable one-component organosilicon compositions exhibiting excellent resilience and adhesiveness contain an α-alkoxysilyl-terminated base polymer, aminoalkylalkoxysilane adhesion promoter, and polyolefin bearing succinic anhydride groups.

12 Claims, No Drawings

CROSS-LINKABLE ORGANOSILICON-BASED COMPOSITIONS

CROSS-REFERENCE TO RELATED APPLICATIONS

This application is the U.S. National Phase of PCT Appln. No. PCT/EP2010/059687 filed Jul. 7, 2010 which claims priority to German application DE 10 2009 027 817.6 filed Jul. 17, 2009.

BACKGROUND OF THE INVENTION

1. Field of the Invention

The invention relates to crosslinkable compositions which comprise silyl-terminated polymers, to processes for preparing them, to moldings produced from these compositions and to the use of the compositions for adhesively bonding workpieces.

2. Description of the Related Art

Polymer systems which possess reactive alkoxysilyl groups have been known for a long time. In the presence of atmospheric moisture, these alkoxysilane-terminated polymers are capable, even at room temperature, of condensing with one another, with elimination of the alkoxy groups. Depending on the level of alkoxysilane groups and on their construction, the products of the condensation are primarily long-chain polymers (thermoplastics), relatively wide-meshed, three-dimensional networks (elastomers) or else highly crosslinked systems (thermosets).

In line with the countless possibilities for the design of silane-terminated polymer systems of this kind, it is possible for not only the properties of the non-crosslinked polymers or of the polymer-containing mixtures (viscosity, melting point, solubilities, etc.) but also the properties of the fully crosslinked compositions (hardness, elasticity, tensile strength, elongation at break, heat resistance, etc.) to be tailored on a virtually custom basis. Correspondingly diverse, therefore, are the possibilities for use of such silane-terminated polymer systems as well. Thus, for example, they can be used for producing elastomers, sealants, adhesives, elastic adhesive systems, rigid and flexible foams, any of a very wide variety of coating systems, or for impression compounds. These products can be applied in any form, as for example by spreading, spraying, pouring, pressing, knifing, etc., depending on the composition of the formulations.

In addition to the curing of the compositions and the mechanical properties of the vulcanizate, a requirement, particularly in the case of applications in the adhesives and sealants segment, is for good adhesion to a host of different substrates, and good elastic properties. Formulations of silane-crosslinking polymers generally exhibit very good properties in these respects.

The adhesion profile is often enhanced or optimized by addition of organofunctional silanes as adhesion promoters. Silanes having primary amino groups in particular, such as 3-aminopropyltrimethoxysilane, provide a distinct improvement in adhesion properties, and hence this type of silane is present in virtually all adhesives and sealants based on silane-terminated polymers. The use of such silanes is known to the art and is described in various monographs or publications. In addition, there are also special, newly developed adhesion promoter silanes, as described in EP-A 997 469 or EP-A 1 216 263, although a combination of silanes, as shown in EP-A 1 179 571, is often conducive.

In addition to good adhesion, adhesives, and especially sealants, must also exhibit very good elasticity. A part is played here not only by the elongation, but also by the relaxation after elongation or compression. This quality is typically measured as compression set, creep behavior, or resilience behavior. For example, the ISO 11600 standard requires a resilience of more than 60% or even 70% for elastic sealants.

The elastic behavior is often determined by the formulation, but also by the nature of the silane-crosslinking base polymers. Organic silane-crosslinking polymers, especially those with difunctional end groups on the polymer, often exhibit inadequate resiliences. Here, it is the formulation that is critical for the properties. For example, U.S. Pat. No. 6,576,733 describes a way of improving the resilience by means of a special catalyst system which, however, contains tin. It is known, further, that the use of branched polymers produces an increase in the network density and hence an improvement in the elasticity. A disadvantage here, however, is the reduction in the chain lengths between two network nodes that accompanies branching, and that usually leads to a marked deterioration in mechanical properties, particularly the elongation at break, but also the tensile strength.

DE-A 102006022834 describes the use of aminoalkyla-lkoxysilanes in combination with epoxy-functional silanes for improving resilience. Disadvantages in this case are an increase in modulus and deterioration of adhesion.

One type of silane-terminated polymer of particular interest is notable for the separation of the reactive alkoxysilyl groups only by one methylene spacer from an adjacent heteroatom. These so-called α-alkoxysilylmethyl end groups possess particularly high reactivity with respect to atmospheric moisture. Corresponding polymers are described in WO 03/014226, for example. For sufficiently rapid curing, these polymers need only very small amounts of toxicologically critical tin catalysts or none at all, and are able on requirement to attain substantially higher curing rates. Accordingly the use of α-alkoxysilyl-terminated prepolymers of this kind is usually particularly desirable.

Nevertheless, elastomers which can be produced from this highly reactive α-silane-crosslinking polymer type, in comparison to elastomers formed from conventional silane-crosslinking polymers which cross-link via γ-alkoxysilylpropyl end groups, possess the disadvantage of a much lower resilience, which for many applications is inadequate, especially when the aminoalkylsilanes with primary amine groups, that are particularly preferred for the adhesion, are used.

SUMMARY OF THE INVENTION

The invention provides crosslinkable compositions based on organosilicon compounds comprising (A) polymers having at least one end group of the general formula

$$-L-CR_2-SiR^2{}_{3-x}(OR^1)_x \quad (1)$$

where

L denotes a divalent radical selected from —O—, —S—, —(R³)N—, —O—CO—N(R³)—, —N(R³)—CO—O—, —N(R³)—CO—NH— and —N(R³)—CO—N(R³)—, R may be identical or different and denotes hydrogen or an alkyl radical, R¹ may be identical or different and denotes optionally substituted hydrocarbon radicals, which may be interrupted by oxygen atoms, R² may be identical or different and has the definition indicated for radical R¹, R³ may be identical or different and denotes hydrogen atom or an optionally halogen-substituted hydrocarbon radical, and x is 2 or 3, (B) curing catalysts,
(C) aminoalkylalkoxysilanes and/or partial hydrolysates thereof,
and
(D) polyolefins containing succinic anhydride.

Radical L preferably comprises —O—CO—N(R³)—, —N(R³)—CO—NH—, —NH—CO—N(R³)—, and —N(R³)—CO—N(R³)—, where R³ has the definition indicated for it above; more preferably L is —O—CO—N(R³)—, more particularly —O—CO—NH—.

x is preferably 3.

Examples of hydrocarbon radicals R³ are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radical; cycloalkyl radicals such as cyclopentyl, cyclohexyl, cycloheptyl radicals and methylcyclohexyl radicals; aryl radicals such as the phenyl and the naphthyl radicals; alkaryl radicals such as o-, m-, and p-tolyl radicals, xylyl radicals, and ethylphenyl radicals; and aralkyl radicals such as the benzyl radical, and the α- and the β-phenylethyl radicals.

Examples of substituted radicals R³ are the 3-chloropropyl radical and the 3,3,3-trifluoropropyl radical.

Radical R³ is preferably hydrogen, a cyclic, linear or branched $C_1$ to $C_{18}$ alkyl or alkenyl radical, or a $C_6$ to $C_{18}$ aryl radical, more preferably hydrogen or a hydrocarbon radical having 1 to 6 carbon atoms, more preferably hydrogen or an alkyl radical having 1 to 4 carbon atoms, and most preferably hydrogen.

Examples of radicals R are hydrogen and the alkyl radicals indicated for R³. Radical R is preferably hydrogen or a methyl radical, more preferably hydrogen.

Examples of radicals R¹ and R² are those examples indicated for radical R³.

The radicals R¹ are preferably hydrocarbon radicals having 1 to 6 carbon atoms and alkyloxyalkyl radicals having a total of 2 to 20 carbon atoms, more preferably hydrocarbon radicals having 1 to 6 carbon atoms, yet more preferably an alkyl radical having 1 to 4 carbon atoms, and most preferably methyl and ethyl radicals.

The radicals R² are preferably hydrocarbon radicals having 1 to 6 carbon atoms, more preferably an alkyl radical having 1 to 4 carbon atoms, and most preferably a methyl radical.

Examples of end groups of the formula (1) are O—CH₂—Si (CH₃)(OCH₃)₂, O—CH₂—Si(CH₃)(OCH₂CH₃)₂, O—CH₂—Si(OCH₃)₃, O—CH₂—Si(OCH₂CH₃)₃, O—CH(CH₃)—Si (CH₃)(OCH₃)₂, O—CH(CH₃)—Si (CH₃)(OCH₂CH₃)₂, O—CH(CH₃)—Si(OCH₃)₃, O—CH(CH₃)—Si(OCH₂CH₃)₃, O—CO—N(CH₃)—CH₂—Si(CH₃)(OCH₃)₂, O—CO—N(CH₃)—CH₂—Si(CH₃)(OCH₂CH₃)₂, O—CO—N(CH₃)—CH₂—Si(OCH₃)₃, O—CO—N(CH₃)—CH₂—Si(OCH₂CH₃)₃, O—CO—N(CH₃)—CH(CH₃)—Si(CH₃)(OCH₃)₂, O—CO—N(CH₃)—CH(CH₃)—Si(CH₃)(OCH₂CH₃)₂, O—CO—N(CH₃)—CH(CH₃)—Si(OCH₃)₃, O—CO—N(CH₃)—CH(CH₃)—Si(OCH₂CH₃)₃, O—CO—NH—CH₂—Si(CH₃)(OCH₃)₂, O—CO—NH—CH₂—Si(CH₃)(OCH₂CH₃)₂, O—CO—NH—CH₂—Si(OCH₃)₃, O—CO—NH—CH₂—Si(OCH₂CH₃)₃, O—CO—NH—CH(CH₃)—Si(CH₃)(OCH₃)₂, O—CO—NH—CH(CH₃)—Si(CH₃)(OCH₂CH₃)₂, O—CO—NH—CH(CH₃)—Si(OCH₃)₃, and O—CO—NH—CH(CH₃)—Si(OCH₂CH₃)₃.

The polymers which form the basis for component (A) used in accordance with the invention may be any desired organic and organosilicon polymers known to date. They may have branched or unbranched main chains with any desired average chain lengths. They may be composed of different units, such as, for example, of polysiloxanes, polysiloxane-urea/urethane copolymers, polyurethanes, polyureas, polyethers, polyesters, polyacrylates and polymethacrylates, polycarbonates, polystyrenes, polyamides, polyvinyl esters or polyolefins, for example, polyethylene, polybutadiene, ethylene-olefin copolymers or styrene-butadiene copolymers. It is of course also possible for any desired mixtures or combinations of polymers having different main chains to be used.

Examples of polymers which form a basis for component (A) are polyethers, examples being those available commercially under the name "Acclaim 12200", "Acclaim 18000" (both Bayer AG, Germany), "Alcupol 12041LM" from Repsol, Spain, and "Poly L 220-10" from Arch Chemicals, USA), polyesters, polycarbonates, polyester carbonates, examples being those available commercially under the name "Desmophen 1700" and "Desmophen C-200" from Bayer AG, Germany, polybutenyls and polybutadienyls, examples being those available commercially under the name "Poly Bd® R-45 HTLO" from Sartomer Co., Inc., USA or "Kraton™ Liquid L-2203" from Kraton Polymers US L.L.C.

The polymers on which component (A) is based are preferably polyesters, polyethers and polyurethanes.

The polymers (A) used in accordance with the invention are commercial products and/or can be prepared by methods commonplace in chemistry. The polymers (A) may preferably be prepared by a) copolymerization with participation of unsaturated monomers which possess groups of the general formula (1). Examples of such monomers are (meth)acryloyloxymethyl-trimethoxysilane, (meth)acryloyloxymethyl-methyldimethoxysilane, and the corresponding ethoxysilyl compounds;

b) grafting of unsaturated monomers which possess groups of the general formula (1) onto thermoplastics such as polyethylene. Examples of such monomers are (meth)acryloyloxymethyl-trimethoxysilane, (meth)acryloyloxymethyl-methyl-dimethoxysilane, and the corresponding ethoxysilyl compounds; or c) reaction of prepolymers (A1) which possess suitable functional groups with one or more organosilanes (A2) of the general formula

B—(CH₂)—SiR²₃₋ₓ(OR¹)ₓ            (2)

in which x, R¹ and R² have one of the definitions stated above, and B represents a functional group which is reactive toward the functional groups of the prepolymers (A1) used.

Examples of polymers (A) used in accordance with the invention are

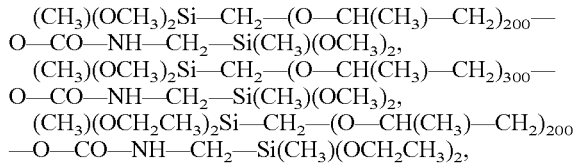

(CH₃)(OCH₃)₂Si—CH₂—(O—CH(CH₃)—CH₂)₂₀₀—O—CO—NH—CH₂—Si(CH₃)(OCH₃)₂, (CH₃)(OCH₃)₂Si—CH₂—(O—CH(CH₃)—CH₂)₃₀₀—O—CO—NH—CH₂—Si(CH₃)(OCH₃)₂, (CH₃)(OCH₂CH₃)₂Si—CH₂—(O—CH(CH₃)—CH₂)₂₀₀—O—CO—NH—CH₂—Si(CH₃)(OCH₂CH₃)₂,

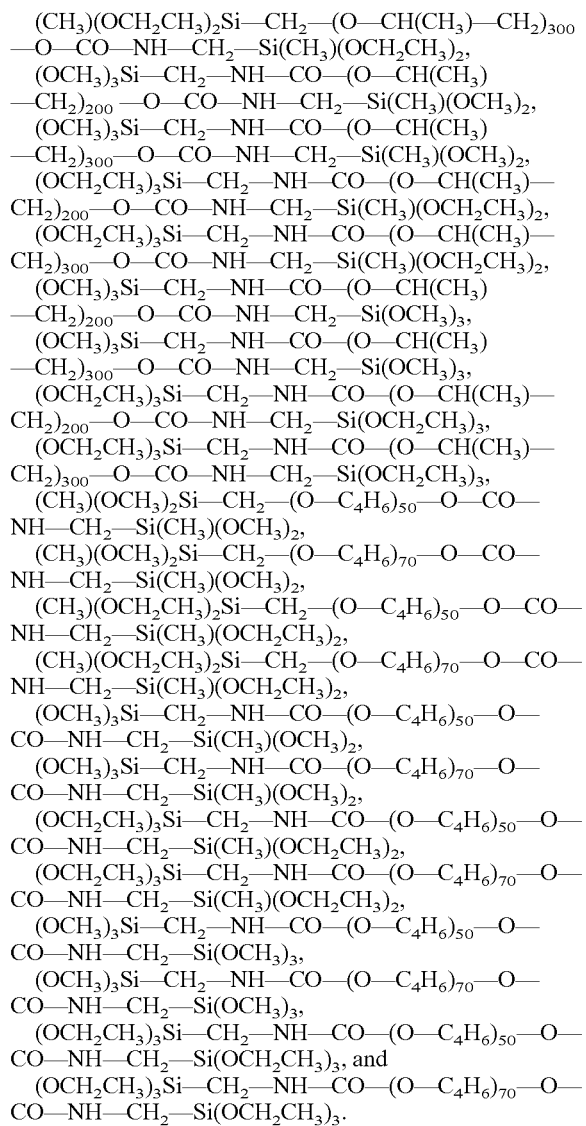

(CH₃)(OCH₂CH₃)₂Si—CH₂—(O—CH(CH₃)—CH₂)₃₀₀—O—CO—NH—CH₂—Si(CH₃)(OCH₂CH₃)₂,
(OCH₃)₃Si—CH₂—NH—CO—(O—CH(CH₃)—CH₂)₂₀₀—O—CO—NH—CH₂—Si(CH₃)(OCH₃)₂,
(OCH₃)₃Si—CH₂—NH—CO—(O—CH(CH₃)—CH₂)₃₀₀—O—CO—NH—CH₂—Si(CH₃)(OCH₃)₂,
(OCH₂CH₃)₃Si—CH₂—NH—CO—(O—CH(CH₃)—CH₂)₂₀₀—O—CO—NH—CH₂—Si(CH₃)(OCH₂CH₃)₂,
(OCH₂CH₃)₃Si—CH₂—NH—CO—(O—CH(CH₃)—CH₂)₃₀₀—O—CO—NH—CH₂—Si(CH₃)(OCH₂CH₃)₂,
(OCH₃)₃Si—CH₂—NH—CO—(O—CH(CH₃)—CH₂)₂₀₀—O—CO—NH—CH₂—Si(OCH₃)₃,
(OCH₃)₃Si—CH₂—NH—CO—(O—CH(CH₃)—CH₂)₃₀₀—O—CO—NH—CH₂—Si(OCH₃)₃,
(OCH₂CH₃)₃Si—CH₂—NH—CO—(O—CH(CH₃)—CH₂)₂₀₀—O—CO—NH—CH₂—Si(OCH₂CH₃)₃,
(OCH₂CH₃)₃Si—CH₂—NH—CO—(O—CH(CH₃)—CH₂)₃₀₀—O—CO—NH—CH₂—Si(OCH₂CH₃)₃,
(CH₃)(OCH₃)₂Si—CH₂—(O—C₄H₆)₅₀—O—CO—NH—CH₂—Si(CH₃)(OCH₃)₂,
(CH₃)(OCH₃)₂Si—CH₂—(O—C₄H₆)₇₀—O—CO—NH—CH₂—Si(CH₃)(OCH₃)₂,
(CH₃)(OCH₂CH₃)₂Si—CH₂—(O—C₄H₆)₅₀—O—CO—NH—CH₂—Si(CH₃)(OCH₂CH₃)₂,
(CH₃)(OCH₂CH₃)₂Si—CH₂—(O—C₄H₆)₇₀—O—CO—NH—CH₂—Si(CH₃)(OCH₂CH₃)₂,
(OCH₃)₃Si—CH₂—NH—CO—(O—C₄H₆)₅₀—O—CO—NH—CH₂—Si(CH₃)(OCH₃)₂,
(OCH₃)₃Si—CH₂—NH—CO—(O—C₄H₆)₇₀—O—CO—NH—CH₂—Si(CH₃)(OCH₃)₂,
(OCH₂CH₃)₃Si—CH₂—NH—CO—(O—C₄H₆)₅₀—O—CO—NH—CH₂—Si(CH₃)(OCH₂CH₃)₂,
(OCH₂CH₃)₃Si—CH₂—NH—CO—(O—C₄H₆)₇₀—O—CO—NH—CH₂—Si(CH₃)(OCH₂CH₃)₂,
(OCH₃)₃Si—CH₂—NH—CO—(O—C₄H₆)₅₀—O—CO—NH—CH₂—Si(OCH₃)₃,
(OCH₃)₃Si—CH₂—NH—CO—(O—C₄H₆)₇₀—O—CO—NH—CH₂—Si(OCH₃)₃,
(OCH₂CH₃)₃Si—CH₂—NH—CO—(O—C₄H₆)₅₀—O—CO—NH—CH₂—Si(OCH₂CH₃)₃, and
(OCH₂CH₃)₃Si—CH₂—NH—CO—(O—C₄H₆)₇₀—O—CO—NH—CH₂—Si(OCH₂CH₃)₃.

In the compositions of the invention the fraction of polymers (A) is preferably 10% to 70% by weight, more preferably 15% to 50% by weight, and most preferably 20% to 40% by weight.

The curing catalysts (B) used in accordance with the invention may be the same catalysts which have also been used to date for condensation reactions.

Examples of the curing catalysts (B) used in accordance with the invention are titanate esters, such as tetrabutyl titanate, tetrapropyl titanate, tetra-isopropyl titanate, and tetraacetylacetonate-titanate, or else acidic catalysts, such as phosphoric acid and/or phosphoric esters, toluene sulfonic acids and mineral acids. The various catalysts may be used both in pure form and also as mixtures with one another.

Besides these, it is also possible as component (B) to use tin compounds as well, such as dibutyltin dilaurate, dibutyltin maleate, dibutyltin diacetate, dibutyltin dioctanoate, dibutyltin acetylacetonate, dibutyltin oxide or corresponding compounds of dioctyltin, although this is not preferred.

The compositions of the invention preferably comprise curing catalysts (B) in amounts of 0.01 to 10 parts by weight, more preferably 0.05 to 5 parts by weight, based in each case on the total weight of component (A).

The compositions of the invention preferably comprise less than 0.1 part by weight, more preferably less than 0.05 part by weight, and most preferably less than 0.02 part by weight, of one or more tin catalysts, based in each case on the total weight of component (A), and very preferably the composition of the invention is free from any tin-containing catalysts.

Examples of the aminoalkylalkoxysilanes (C) used in accordance with the invention, which are used preferably as adhesion promoters, are 3-aminopropyl-trimethoxysilane, 3-aminopropyltriethoxysilane, N-cyclohexylaminopropyltrimethoxysilane, N-cyclohexylaminopropyltriethoxysilane, 2-aminoethyl-3-aminopropyltrimethoxysilane, 2-aminoethyl-3-aminopropyltriethoxysilane, N-morpholino-3-aminopropyltrimethoxysilane, N-morpholino-3-aminopropyltriethoxysilane, N-piperazino-3-aminopropyltrimethoxysilane, N-piperazino-3-aminopropyltriethoxysilane, methylcarbamatopropyltrimethoxysilane, methylcarbamatopropyltriethoxysilane, methylcarbamatopropyl(methyldimethoxy)silane, methylcarbamatopropyl(methyldiethoxy)silane, N-cyclohexyl-aminomethyltrimethoxysilane, N-cyclohexyl-aminomethyltriethoxysilane, 2-aminoethyl-aminomethyltrimethoxysilane, 2-aminoethyl-aminomethyltriethoxysilane, N-morpholino-aminomethyltrimethoxysilane, N-morpholino-aminomethyltriethoxysilane, N-piperazino-aminomethyltrimethoxysilane, N-piperazino-aminomethyltriethoxysilane, N-phenylaminomethyltrimethoxysilane, N-phenylaminomethyltriethoxysilane, 3-aminopropyl(methyldimethoxy)silane, 3-aminopropyl(methyldiethoxy)silane, N-cyclohexyl-aminopropyl(methyldimethoxy)silane, N-cyclohexyl-aminopropyl(methyldiethoxy)silane, 2-aminoethyl-3-aminopropyl(methyldimethoxy)silane, 2-aminoethyl-3-aminopropyl(methyldiethoxy)silane, N-morpholino-3-aminopropyl(methyldimethoxy)silane, N-morpholino-3-aminopropyl(methyldiethoxy)silane, N-piperazino-3-aminopropyl(methyldimethoxy)silane, N-piperazino-3-aminopropyl(methyldiethoxy)silane, N-cyclohexyl-aminomethyl(methyldimethoxy)silane, N-cyclohexyl-aminomethyl(methyldiethoxy)silane, 2-aminoethyl-aminomethyl(methyldimethoxy)silane, 2-aminoethyl-aminomethyl(methyldiethoxy)silane, N-morpholino-aminomethyl(methyldimethoxy)silane, N-morpholino-aminomethyl(methyldiethoxy)silane, N-piperazino-aminomethyl(methyldimethoxy)silane, N-piperazino-aminomethyl(methyldiethoxy)silane, N-phenylaminomethyl(methyldimethoxy)silane, N-phenylaminomethyl(methyldiethoxy)silane, methylcarbamatomethyltrimethoxysilane, methylcarbamatomethyltriethoxysilane, methylcarbamatomethyl(methyldimethoxy)silane, and also methylcarbamatomethyl(methyldiethoxy)silane and/or partial hydrolysates thereof.

Component (C) preferably comprises aminopropyl-trimethoxysilane, 2-aminoethyl-3-aminopropyltrimethoxy-silane, methylcarbamatomethyltrimethoxysilane, methylcarbamatomethyltriethoxysilane, methylcarbamatomethyl(methyldimethoxy)silane, methyl-carbamatomethyl(methyldiethoxy)silane, and/or partial hydrolysates thereof, more preferably aminopropyl-trimethoxysilane and/or partial hydrolysates thereof.

These partial hydrolysates (C) may be partial homohydrolysates, i.e. partial hydrolysates of one kind of aminoalkylalkoxysilane, or else may be partial cohydrolysates, i.e. partial hydrolysates of at least two different kinds of aminoalkylalkoxysilanes. Where the compound (C) used in the materials of the invention comprises partial hydrolysates of aminoalkyl-alkoxysilanes, preference is given to those having up to 6 silicon atoms.

In the compositions of the invention the fraction of component (C) is preferably 0.1% to 10% by weight, more preferably 0.1 to 5% by weight, most preferably 0.2 to 3% by weight.

Examples of the component (D) used in accordance with the invention are maleic anhydride-grafted polyisobutenes, obtainable for example from polyisobutene (e.g., Glissopal® from BASF AG, Ludwigshafen, Germany) and maleic anhydride, available commercially as ADEX™ from Lubrizol, Brussels, Belgium) and maleic anhydride adducts of a low molecular mass 1,4-cis-polybutadiene with succinic anhydride groups distributed randomly along the polymer chains, available commercially for example as Polyvest® from Evonik (Essen, Germany) or Ricobond® from Sartomer (Paris, France).

The component (D) used in accordance with the invention may comprise polyolefins grafted singly or multiply with maleic anhydride.

The polyolefins (D) containing succinic anhydride preferably have a viscosity of 100 to 100,000 mPas, more preferably 500 to 80,000 mPas, in each case at 20° C., and preferably have an acid number of 5 to 300, more preferably 30 to 250, and most preferably 40 to 230.

For the purposes of the present invention, the acid number is determined in accordance with DIN ISO 2114 (as dicarboxylic acid) and indicates the mass of potassium hydroxide in mg that is needed for neutralizing 1 g of the sample under analysis.

The polyolefins (D) containing succinic anhydride that are used in accordance with the invention are commercial products and/or can be prepared by processes commonplace in chemistry.

The component (D) used in accordance with the invention preferably comprises polyisobutenes containing succinic anhydride and polybutadienes containing succinic anhydride, more preferably polybutadienes containing succinic anhydride.

The maleinized polyisobutenes (D) used in accordance with the invention contain preferably 1 to 2 succinic anhydride groups, more preferably one succinic anhydride group, and preferably have molecular weights Mn of 500 to 5000 g/mol, more preferably 1000 to 3500 g/mol, and most preferably of 1000 to 3000 g/mol, and preferably have viscosities of 100 to 20,000 mm$^2$/s, more preferably 500 to 8000 mm$^2$/s, in each case at 100° C.

The polybutadienes (D) containing succinic anhydride preferably possess viscosities of from 2000 to 100,000 mPas, more preferably from 5000 to 80,000 mPas, in each case at 20° C., and preferably have an acid number of 30 to 200 mg KOH/g, more preferably 30 to 150 mg KOH/g.

The polymers forming the basis for the polybutadienes (D) containing succinic anhydride that are used in accordance with the invention may preferably be butadienes having a fraction of 1,4-cis double bonds of 50% to 100%, more preferably 60% to 80%, and a viscosity at 20° C. of preferably 100 to 10,000 mPas, more preferably 500 to 5000 mPas.

The polymers forming the basis for the polybutadienes (D) containing succinic anhydride that are used in accordance with the invention may alternatively be polybutadienes preferably having a fraction of 1,2-vinyl double bonds of 50% to 100%, more preferably 60% to 80%, and preferably a molecular weight Mn of 500 to 10,000 g/mol, more preferably 1000 to 5000 g/mol, and most preferably 500 to 6000 g/mol.

Component (D) is preferably used in the compositions of the invention in amounts of 0.1 to 10 parts by weight, more preferably 0.5 to 5 parts by weight, and most preferably 1 to 3 parts by weight, based in each case on the total weight of the composition.

In addition to components (A) to (D), the compositions of the invention may comprise all further components which are useful in crosslinkable compositions, for example, fillers (E), non-amino-functional organosilanes (F), plasticizers (G), and additives (H).

Examples of optionally used fillers (E) are calcium carbonates in the form of natural ground chalks, ground and coated chalks, precipitated chalks, precipitated and coated chalks, clay minerals, bentonites, kaolins, talc, titanium dioxides, aluminum oxides, aluminum trihydrate, magnesium oxide, magnesium hydroxide, carbon blacks, and precipitated or fumed, hydrophilic or hydrophobic silicas.

The fillers (E) are preferably calcium carbonates and precipitated or fumed, hydrophilic or hydrophobic silicas, more preferably fumed, hydrophilic or hydrophobic silicas, most preferably fumed hydrophilic silicas.

Filler (E) is preferably used in amounts of 0 to 1000 parts by weight, more preferably 5 to 200 parts by weight, most preferably 10 to 100 parts by weight, based in each case on the component (A). The compositions of the invention preferably contain filler (E).

The optionally used other silanes (F) are preferably non-amino-functional organosilanes, which may be used as water scavengers and/or silane crosslinkers. Examples of silanes (F) are organyloxysilanes such as methyltrimethoxysilane, methyltriethoxysilane, propyltrimethoxysilane, propyltriethoxysilane, vinylsilanes such as vinyltrimethoxy-, vinyltriethoxy-, and vinylmethyldimethoxysilane, O-methylcarbamatomethyl-methyldimethoxysilane, O-methylcarbamatomethyl-trimethoxysilane, O-ethylcarbamatomethyl-methyldiethoxysilane, O-ethylcarbamatomethyl-triethoxysilane, O-methylcarbamatopropyl-methyldimethoxysilane, O-methylcarbamatopropyl-trimethoxysilane, O-ethylcarbamatopropyl-methyldiethoxysilane, O-ethylcarbamatopropyl-triethoxysilane, methacrylatomethyl-methyldimethoxysilane, methacrylatomethyl-trimethoxysilane, methacrylatomethyl-methyldiethoxysilane, methyacrylatomethyl-triethoxysilane, acrylatomethyl-methyldimethoxysilane, acrylatomethyl-trimethoxysilane, acrylatomethyl-methyldiethoxysilane, acrylatomethyl-triethoxysilane, methacrylatopropyl-methyldimethoxysilane, methacrylatopropyl-trimethoxysilane, methacrylatopropyl-methyldiethoxysilane, methacrylatopropyl-triethoxysilane, acrylatopropyl-methyldimethoxysilane, acrylatopropyl-trimethoxysilane, acrylatopropyl-methyldiethoxysilane, acrylatopropyl-triethoxysilane, glycidyloxypropyltrimethoxysilane, tetraethoxysilane and/or partial hydrolysates of these silanes.

The partial hydrolysates (F) may be partial homohydrolysates, i.e., partial hydrolysates of a single organyloxysilane, or may be partial cohydrolysates, i.e., partial hydrolysates of at least two different organyloxysilanes. Where the compound (F) used in the materials of the invention comprises partial hydrolysates of organyloxysilanes, preference is given to those having up to 6 silicon atoms.

Component (F) is preferably used in the compositions of the invention in amounts of preferably 0 to 50 parts by weight, more preferably 0.5 to 10 parts by weight, and most preferably 1 to 5 parts by weight, based in each case on the total weight of the composition of the invention. The compositions of the invention preferably contain component (F).

Examples of optionally used plasticizers (G) are phthalate esters such as dioctyl phthalate, diisooctyl phthalate, and diundecyl phthalate, adipic esters such as dioctyl adipate, benzoic esters, glycol esters, phosphoric esters, sulfonic esters, polyesters, polyethers, polystyrenes, polybutadienes, polyiso-butenes, paraffinic hydrocarbons, and higher, branched hydrocarbons, which are different from the components (A) and (D).

Plasticizer (G) is optionally used in the compositions of the invention preferably in amounts of 0 to 200 parts by weight, more preferably 10 to 100 parts by weight, and most preferably 30 to 90 parts by weight, based in each case on component (A). The compositions of the invention preferably comprise plasticizer (G).

The compositions of the invention may further comprise, as additives (H), all adjuvants which are useful in conventional alkoxy-crosslinking, one-component materials, such as, for example, further adhesion promoters, pigments, dyes, odorants, oxidation inhibitors, agents for influencing electrical properties, such as conductive carbon black, flame retardants, light stabilizers, and agents for prolonging skin-formation time, such as silanes having an SiC-bonded mercaptoalkyl radical, cell generators, e.g., azodicarbonamide, heat stabilizers, and thixotropic agents such as phosphoric esters, polyamide waxes, hydrogenated castor oils, stearate salts, and organic solvents such as alkylaromatics.

Additives (H) are preferably used in the compositions of the invention in amounts of 0 to 20 parts by weight, more preferably 1 to 10 parts by weight, and most preferably 1 to 5 parts by weight, based in each case on the total weight of the composition of the invention. The compositions of the invention preferably comprise none of the additives (H).

The crosslinkable compositions of the invention are preferably those comprising
(A) polymers having at least one end group of the general formula (1),
(B) curing catalysts,
(C) aminoalkylalkoxysilanes and/or partial hydrolysates thereof,
(D) polyolefins containing succinic anhydride,
(E) optionally, fillers,
(F) optionally, non-amino-functional organosilanes and/or partial hydrolysates thereof,
(G) optionally, plasticizers, and
(H) optionally, further additives.

With particular preference the crosslinkable compositions of the invention comprise no further constituents beyond these.

For producing the materials of the invention it is possible for all of the constituents to be mixed with one another in any desired order. This mixing may take place at room temperature under the pressure of the surrounding atmosphere, in other words at about 900 to 1100 hPa. If desired, however, this mixing may also take place at higher temperatures, as for example at temperatures in the range from 35 to 135° C. The mixing preferably takes place in the absence of moisture.

With regard to the individual constituents of the materials of the invention, there may in each case be one kind of such a constituent or else a mixture of at least two different kinds of such constituents.

The typical water content of the air is sufficient for the crosslinking of the compositions of the invention. The crosslinking of the compositions of the invention preferably takes place at room temperature. It can, if desired, also be carried out at higher or lower temperatures than room temperature, as for example at −5° to 15° C. or at 30° to 50° C., and/or by means of water concentrations that exceed the normal water content of the air.

The crosslinking is preferably carried out at a pressure of 100 to 1100 hPa, more preferably at the pressure of the surrounding atmosphere.

The present invention additionally provides moldings produced by crosslinking the compositions of the invention. The moldings of the invention are distinguished by high resilience after elongation. Thus, for example, after a 24-hour elongation by 30%, preferably a DIN 53504 resilience of more than 60%, more preferably more than 65%, and most preferably more than 70% is achieved.

The compositions of the invention can be employed for all end uses for which crosslinkable compositions comprising silyl-terminated polymers are useful.

The compositions of the invention are therefore outstandingly suitable, for example, as adhesives, sealants, including joint sealants, surface coatings, and also in the preparation of impression compounds and shaped parts.

The polymer blends of the invention are suitable for countless different substrates such as, for example, mineral substrates, metals, plastics, glass, ceramic, painted surfaces, etc.

The compositions of the invention have the advantage that they are easy to prepare and can be easily processed.

Furthermore, the compositions of the invention have the advantage that they can be used for producing moldings which have a significantly enhanced resilience on elongation, without any adverse effect on other properties, such as the adhesion or the modulus. On many substrates, the moldings of the invention exhibit excellent adhesion.

In the examples described below, all viscosities relate to a temperature of 25° C. Unless indicated otherwise, the examples below are carried out at a pressure of the surrounding atmosphere, i.e., approximately, at 1000 hPa, and at room temperature, i.e., at approximately 23° C., or at a temperature which comes about when the reactants are combined at room temperature without additional heating or cooling, and also at a relative atmospheric humidity of approximately 50%. Furthermore, all indications of parts and percentages, unless indicated otherwise, relate to the weight.

The mechanical characteristics are determined in accordance with DIN 53504 and DIN 53505. The resilience is determined using S2 test specimens after 1 week of vulcanization or after 4 weeks of vulcanization at 23° C. and 50% relative atmospheric humidity. The S2 test specimens are elongated by 100% for 24 hours, then relaxed, without elongation, for 1 hour, after which the measurement takes place.

COMPARATIVE EXAMPLE 1

C1

75 g of silane-terminated polyether A (commercially available under the name GENIOSIL® STP-E10 from Wacker Chemie AG, Germany) are mixed in a Speedmixer from Hauschild (D-59065 Hamm) at around 25° C. with 40 g of polypropylene glycol (commercially available under the name "PPG 2000" from Dow Chemical, Midland, USA) and 6 g of vinyltrimethoxysilane for 2 minutes at 200 rpm. Thereafter 9 g of a hydrophilic fumed silica having a BET surface area of 170 to 230 $m^2/g$ (commercially available under the name HDK® N20 from Wacker Chemie AG, Germany) are stirred in until it is homogeneously distributed. Then 165 g of coated ground chalk having a surface area of 30 to 80 $m^2/g$ are introduced, and the filler is incorporated at 600 rpm for one minute with stirring. Following incorporation of the chalk, 3 g of aminopropyltrimethoxysilane (commercially available under the name GENIOSIL® GF96 from Wacker Chemie AG, Germany) are dispersed at 200 rpm for 1 minute. The resulting mixture is subjected for 2 minutes at 600 rpm and 1 minute at 200 rpm under a partial vacuum of about 100 mbar to homogenization and bubble-free stirring.

The formulation is dispensed into 310 ml PE cartridges and stored at 25° C. for 24 hours.

The crosslinkable materials are caused to crosslink, and the mechanical characteristics are ascertained. The results are found in table 1.

INVENTIVE EXAMPLE 1

I1

75 g of silane-terminated polyether A (commercially available under the name GENIOSIL® STP-E10 from Wacker Chemie AG, Germany) are mixed in a Speedmixer from Hauschild (D-59065 Hamm) at around 25° C. with 40 g of polypropylene glycol (commercially available under the name "PPG 2000" from Dow Chemical, Midland, USA) and 6 g of vinyltrimethoxysilane for 2 minutes at 200 rpm. Thereafter 9 g of a hydrophilic fumed silica having a BET surface area of 170 to 230 $m^2/g$ (commercially available under the name HDK® N20 from Wacker Chemie AG, Germany) are stirred in until it is homogeneously distributed. Then 165 g of coated ground chalk having a surface area of 30 to 80 $m^2/g$ are introduced, and the filler is incorporated at 600 rpm for one minute with stirring. Following incorporation of the chalk, 3 g of aminopropyltrimethoxysilane (commercially available under the name GENIOSIL® GF96 from Wacker Chemie AG, Germany) are dispersed at 200 rpm for 1 minute. 3 g of a maleic acid-grafted polybutadiene having an acid number of 130 mg KOH/g to DIN ISO 2114 (commercially available under the name "Polyvest EP OC 1200 S" from Evonik, Germany) are added and then the mixture is subjected for 2 minutes at 600 rpm and 1 minute at 200 rpm under a partial vacuum of about 100 mbar to homogenization and bubble-free stirring.

The resulting formulation is dispensed into 310 ml PE cartridges and stored at 25° C. for 24 hours.

The crosslinkable materials are caused to crosslink, and the mechanical characteristics are ascertained. The results are found in table 1.

INVENTIVE EXAMPLE 2

I2

75 g of silane-terminated polyether A (commercially available under the name GENIOSIL® STP-E10 from Wacker Chemie AG, Germany) are mixed in a Speedmixer from Hauschild (D-59065 Hamm) at around 25° C. with 40 g of polypropylene glycol (commercially available under the name "PPG 2000" from Dow Chemical, Midland, USA) and 6 g of vinyltrimethoxysilane for 2 minutes at 200 rpm. Thereafter 9 g of a hydrophilic fumed silica having a BET surface area of 170 to 230 $m^2/g$ (commercially available under the name HDK® N20 from Wacker Chemie AG, Germany) are stirred in until it is homogeneously distributed. Then 165 g of coated ground chalk having a surface area of 30 to 80 $m^2/g$ are introduced, and the filler is incorporated at 600 rpm for one minute with stirring. Following incorporation of the chalk, 3 g of aminopropyltrimethoxysilane (commercially available under the name GENIOSIL® GF96 from Wacker Chemie AG, Germany) are dispersed at 200 rpm for 1 minute. 6 g of a maleic acid-grafted polybutadiene having an acid number of 130 mg KOH/g to DIN ISO 2114 (commercially available under the name "Polyvest EP OC 1200 S" from Evonik, Germany) are added and then the mixture is subjected for 2 minutes at 600 rpm and 1 minute at 200 rpm under a partial vacuum of about 100 mbar to homogenization and bubble-free stirring.

The resulting formulation is dispensed into 310 ml PE cartridges and stored at 25° C. for 24 hours.

The crosslinkable materials are caused to crosslink, and the mechanical characteristics are ascertained. The results are found in table 1.

INVENTIVE EXAMPLE 3

I3

75 g of silane-terminated polyether A (commercially available under the name GENIOSIL® STP-E10 from Wacker Chemie AG, Germany) are mixed in a Speedmixer from Hauschild (D-59065 Hamm) at around 25° C. with 40 g of polypropylene glycol (commercially available under the name "PPG 2000" from Dow Chemical, Midland, USA) and 6 g of vinyltrimethoxysilane for 2 minutes at 200 rpm. Thereafter 9 g of a hydrophilic fumed silica having a BET surface area of 170 to 230 $m^2/g$ (commercially available under the name HDK® N20 from Wacker Chemie AG, Germany) are stirred in until it is homogeneously distributed. Then 165 g of coated ground chalk having a surface area of 30 to 80 $m^2/g$ are introduced, and the filler is incorporated at 600 rpm for one minute with stirring. Following incorporation of the chalk, 3 g of aminopropyltrimethoxysilane (commercially available under the name GENIOSIL® GF96 from Wacker Chemie AG, Germany) are dispersed at 200 rpm for 1 minute. 9 g of a maleic acid-grafted polybutadiene having an acid number of 130 mg KOH/g to DIN ISO 2114 (commercially available under the name "Polyvest EP OC 1200 S" from Evonik, Germany) are added and then the mixture is subjected for 2 minutes at 600 rpm and 1 minute at 200 rpm under a partial vacuum of about 100 mbar to homogenization and bubble-free stirring.

The resulting formulation is dispensed into 310 ml PE cartridges and stored at 25° C. for 24 hours.

The crosslinkable materials are caused to crosslink, and the mechanical characteristics are ascertained. The results are found in table 1.

INVENTIVE EXAMPLE 4

I4

75 g of silane-terminated polyether A (commercially available under the name GENIOSIL® STP-E10 from Wacker Chemie AG, Germany) are mixed in a Speedmixer from Hauschild (D-59065 Hamm) at around 25° C. with 40 g of polypropylene glycol (commercially available under the name "PPG 2000" from Dow Chemical, Midland, USA) and 6 g of vinyltrimethoxysilane for 2 minutes at 200 rpm. Thereafter 9 g of a hydrophilic fumed silica having a BET surface area of 170 to 230 $m^2/g$ (commercially available under the name HDK® N20 from Wacker Chemie AG, Germany) are stirred in until it is homogeneously distributed. Then 165 g of coated ground chalk having a surface area of 30 to 80 $m^2/g$ are introduced, and the filler is incorporated at 600 rpm for one minute with stirring. Following incorporation of the chalk, 3 g of aminopropyltrimethoxysilane (commercially available under the name GENIOSIL® GF96 from Wacker Chemie AG, Germany) are dispersed at 200 rpm for 1 minute. 9 g of a maleic acid-grafted polybutadiene having an acid number of 70-90 mg KOH/g to DIN ISO 2114 (commercially available under the name "Polyvest EP OC 800 S" from Evonik, Germany) are added and then the mixture is subjected for 2 minutes at 600 rpm and 1 minute at 200 rpm under a partial vacuum of about 100 mbar to homogenization and bubble-free stirring.

The resulting formulation is dispensed into 310 ml PE cartridges and stored at 25° C. for 24 hours.

The crosslinkable materials are caused to crosslink, and the mechanical characteristics are ascertained. The results are found in table 1.

TABLE 1

|    | Shore hardness [median] | Strain 100% [N/mm$^2$] | Tensile strength [N/mm$^2$] | Elongation at break [%] | Resilience after 1 week [%] | Resilience after 4 weeks [%] |
|----|----|----|----|----|----|----|
| C1 | 54 | 1.43 | 1.8 | 289 | 12.5 | 37.5 |
| I1 | 56 | 1.3 | 1.8 | 256 | 22.5 | 47.5 |
| I2 | 52 | 1.07 | 2.2 | 285 | 57.5 | 70 |
| I3 | 53 | 1.05 | 2.1 | 253 | 72.5 | 82.5 |
| I4 | 51 | 1.04 | 2.1 | 290 | 57.5 | 72.5 |

EXAMPLE 5

The crosslinkable materials obtained in inventive examples 3 and 4 and in comparative example 1 are then investigated for their adhesion behavior to a variety of substrates, such as metals, silicatic substrates, and wood.

The metals were cleaned with methyl ethyl ketone, glass with aqueous surfactant solution, then with fully demineralized water, and methyl ethyl ketone thereafter.

The crosslinkable material in question was subsequently applied in beads with a thickness of around 5-7 mm.

Metals and Silicatic Substrates:

One week's storage in air at room temperature was followed by four weeks' storage in water at a water temperature of 23° C. (A=7 days in air; B=7 days in air+2 weeks' water storage; C=7 days in air+4 weeks' water storage).

Wood:

Wooden test specimens were stored not under water but instead for 4 weeks in an atmospheric cabinet at 50° C./100% relative humidity.

Assessment:
+=good adhesion (cohesive fracture),
Ø=partial adhesion (marginal or zonal adhesion),
−=poor adhesion (adhesive fracture).

The results are found in table 2.

TABLE 2

|  | Inventive example 4 | | | Inventive example 3 | | | Comparative example 1 | | |
|---|---|---|---|---|---|---|---|---|---|
| Storage | A | B | C | A | B | C | A | B | C |
| Metals |  |  |  |  |  |  |  |  |  |
| Aluminum | Ø | + | + | − | + | + | + | Ø | + |
| Eloxal | + | + | + | − | + | + | + | Ø | − |
| V2A stainless steel | + | + | + | − | − | − | + | Ø | Ø |
| Silicatic substrates |  |  |  |  |  |  |  |  |  |
| Concrete | + | − | − | − | − | − | + | − | − |
| Glass (air side) | + | + | + | + | + | + | + | + | + |
| Wood |  |  |  |  |  |  |  |  |  |
| Wood, natural | + | + | + | + | + | + | + | − | − |
| Wood, varnished | + | + | + | − | + | + | + | − | − |

The invention claimed is:

1. Crosslinkable compositions based on organosilicon compounds, comprising:
   (A) polymers having at least one end group of the formula

where
   L denotes a divalent radical selected from the group consisting of —O—, —S—, —(R$^3$)N—, —O—CO—N(R$^3$)—, —N(R$^3$)—CO—O—, —N(R$^3$)—CO—NH— and —N(R$^3$)—CO—N(R$^3$)—,
   R are identical or different and are hydrogen or an alkyl radical,
   R$^1$ are identical or different and are optionally substituted hydrocarbon radicals which may be interrupted by oxygen atoms,
   R$^2$ are identical or different and are defined as for radical R$^1$,
   R$^3$ are identical or different and are hydrogen or an optionally halogen-substituted hydrocarbon radical, and
   x is 2 or 3,
   (B) optionally, one or more curing catalysts,
   (C) aminoalkylalkoxysilanes and/or partial hydrolysates thereof, and
   (D) polyolefins containing succinic anhydride moieties.

2. The composition of claim 1, wherein polymers (A) are present in an amount of 10% to 70% by weight based on the weight of components (A) through (D).

3. The composition of claim 1, wherein the composition contains less than 0.1 part by weight, based on the total weight of component (A), of tin catalyst.

4. The composition of claim 1, wherein component (C) is present in an amount of 0.1% to 10% by weight.

5. The composition of claim 1, wherein the polyolefin(s) (D) containing succinic anhydride moieties have a viscosity at 20° C. of 100 to 100,000 mPas.

6. Crosslinkable compositions based on organosilicon compounds, comprising:
   (A) polymers having at least one end group of the formula

where
   BL denotes a divalent radical selected from the group consisting of —O—, —S—, —(R$^3$)N—, —O—CO—N(R$^3$)—, —N(R$^3$)—CO—O—, —N(R$^3$)—CO—NH— and —N(R$^3$)—CO—N(R$^3$)—,
   R are identical or different and are hydrogen or an alkyl radical,
   R$^1$ are identical or different and are optionally substituted hydrocarbon radicals which may be interrupted by oxygen atoms,
   R$^2$ are identical or different and are defined as for radical R$^1$,
   R$^3$ are identical or different and are hydrogen or an optionally halogen-substituted hydrocarbon radical, and
   x is 2 or 3,
   (B) optionally, one or more curing catalysts,
   (C) aminoalkylalkoxysilanes and/or partial hydrolysates thereof, and
   (D) polyolefins containing succinic anhydride moieties,
   wherein the polyolefin(s) (D) containing succinic anhydride moieties have an acid number of from 5 to 300.

7. Crosslinkable compositions based on organosilicon compounds, comprising:
   (A) polymers having at least one end group of the formula

where

BL denotes a divalent radical selected from the group consisting of —O—, —S—, —($R^3$)N—, —O—CO—N($R^3$)—, —N($R^3$)—CO—O—, —N($R^3$)—CO—NH— and —N($R^3$)—CO—N($R^3$)—, R are identical or different and are hydrogen or an alkyl radical, $R^1$ are identical or different and are optionally substituted hydrocarbon radicals which may be interrupted by oxygen atoms, $R^2$ are identical or different and are defined as for radical $R^1$, $R^3$ are identical or different and are hydrogen or an optionally halogen-substituted hydrocarbon radical, and x is 2 or 3, (B) optionally, one or more curing catalysts, (C) aminoalkylalkoxysilanes and/or partial hydrolysates thereof, and (D) polyolefins containing succinic anhydride moieties, wherein component (D) comprises polyisobutenes containing succinic anhydride moieties polybutadienes containing succinic anhydride moieties, or mixtures thereof.

8. The composition of claim 1, further comprising at least one further ingredient (E) through (H)
(E) fillers,
(F) non-amino-functional organosilanes and/or partial hydrolysates thereof,
(G) plasticizers, and
(H) further additives useful in crosslinkable compositions based on organosilicon compounds.

9. A process for preparing the composition of claim 1, comprising mixing all of the constituents with one another in any desired order.

10. A molding produced by crosslinking the composition of claim 1.

11. The composition of claim 1, which contains no tin catalyst.

12. The composition of claim 1, which contains no curing catalyst.

* * * * *